United States Patent [19]
Gunschera

[11] Patent Number: 5,722,530
[45] Date of Patent: Mar. 3, 1998

[54] CHAIN DRIVE

[75] Inventor: Frank Gunschera, Heidelberg, Germany

[73] Assignee: Heidelberger Druckmaschinen AG, Heidelberg, Germany

[21] Appl. No.: 629,186

[22] Filed: Apr. 8, 1996

[30] Foreign Application Priority Data

Apr. 8, 1995 [DE] Germany .................. 195 13 420.6

[51] Int. Cl.⁶ .................................................. B65G 47/86
[52] U.S. Cl. ........................ 198/803.7; 198/803.9; 198/817; 271/277
[58] Field of Search .................. 198/470.1, 803.7, 198/803.9, 817, 850, 851; 271/277, 204, 206, 82

[56] References Cited

U.S. PATENT DOCUMENTS

| | | | |
|---|---|---|---|
| 2,024,140 | 12/1935 | Belluche | 198/803.7 |
| 3,878,735 | 4/1975 | Preuss . | |
| 4,232,783 | 11/1980 | Kraft . | |
| 4,693,362 | 9/1987 | Kemmerer et al. . | |
| 5,056,773 | 10/1991 | Weisgreber . | |
| 5,511,651 | 4/1996 | Basth | 198/817 |
| 5,555,964 | 9/1996 | Yerly | 198/817 X |

FOREIGN PATENT DOCUMENTS

| | | |
|---|---|---|
| 1 956 691 | 6/1970 | Germany . |
| 31 22 035 | 12/1982 | Germany . |
| 35 02 663 | 6/1986 | Germany . |
| 37 41 242 | 6/1989 | Germany . |
| 39 39 250 | 12/1990 | Germany . |
| 2 243 816 | 11/1991 | Germany . |
| 40 14 877 | 11/1991 | Germany . |
| 298 760 | 3/1992 | Germany . |
| 2 274 875 | 8/1994 | Germany . |

*Primary Examiner*—James R. Bidwell
*Attorney, Agent, or Firm*—Herbert L. Lerner; Laurence A. Greenberg

[57] ABSTRACT

Chain drive with an endless chain formed by sideplate pairs and by articulated joints having mutually parallel joint axes and connecting the sideplate pairs, each of the joints having a chain roller concentric with the respective joint axis and having a cylindrical chain-roller contact surface, includes a supporting roller disposed at a longitudinal center of a chain link and having a rotational axis parallel to the joint axes, and a cylindrical supporting-roller contact surface tangential to a first tangential plane extending parallel to the joint axes of a first and a second joint, the first tangential plane being disposed opposite to and spaced from a second tangential plane likewise tangential to the supporting-roller contact surface, the first and the second tangential planes being disposed on one and the same side of a reference plane at respective first and second distances therefrom.

5 Claims, 4 Drawing Sheets

CHAIN DRIVE

BACKGROUND OF THE INVENTION

FIELD OF THE INVENTION

The invention relates to a chain drive with an endless chain formed by sideplate pairs and by articulated joints having mutually parallel joint axes and connecting the sideplate pairs, each of the joints having a chain roller concentric with the respective joint axis and having a cylindrical chain-roller contact surface, at least one section of the chain being formed by first chain links of equal pitch and a second chain link inserted between two of the first chain links which are disposed mutually adjacent to one another, the second chain link replacing two of the first chain links and being connected, respectively, by a first and a second joint to mutually adjacent first chain links, and sprocket wheels rotating during operation and being in engagement with the chain and with chain guides formed as mutually facing and mutually spaced apart guideways.

Such a chain drive has become known heretofore, for example, from German Patent 39 39 250, wherein a special chain link is inserted after every given number of chain links of an endless roller chain of a given normal pitch, the special chain link extending over two normal pitches. A first and a second sprocket wheel and a roller chain of such construction looped-around them, together with a second identical arrangement, form a transport system wherein the respective first sprocket wheels thereof are rotatable at a mutually spaced-apart distance and with respect to a common first rotational axis, and wherein the respective second sprocket wheels thereof are rotatable at the aforementioned mutual spaced-apart distance and with respect to a common second rotation axis, the two roller chains revolving in phase with respect to their special chain links and respectively carrying, by means of mutually opposing special chain links of the two roller chains, a gripper bar for transporting workpieces which, in the case of the previously known chain drive, are printed sheets which are removed by the gripper bars from a printing unit and are fed to a delivery pile.

Of the mutually opposing guideways of a guideway pair of the hereinaforedescribed, previously known chain drive, only one, respectively, is in contact with the chain-roller contact surfaces. This is also an essential feature of conventional chain drives wherein a transmission chain furnished with chain rollers is guided by means of a guideway pair. Without additional special measures of the type taken particularly in the aforementioned heretofore known chain drive, there results consequently an undefined position of the chain rollers at the guideways. In particular, in the case of a roller-chain section which, having passed through a straight, for example horizontal, section of a guideway pair, then passes through a downwardly curved section of the guideway pair, the chain rollers of the roller-chain section, due to the thereby occurring centrifugal forces, move from a lower guideway to the upper guideway opposite thereto.

If the aforementioned first sprocket wheel, for example, is associated with a delivery drum of a chain delivery which accepts a printed sheet from a printing unit cylinder, and if a guideway section concentric with the root circle of the sprocket wheel is provided for a roller-chain section looped around the sprocket wheel, it is then possible, at the instant of transfer to a delivery drum of a printed sheet from a printing unit cylinder cooperating with the delivery drum, for a change to take place in the contact of the chain rollers, particularly of the chain rollers of the chain links carrying the gripper bars, with respect, firstly, to the bottom land of the sprocket wheel and, secondly, to the section of the guideway concentric with the root circle, especially when the sheet is not yet printed over the entire length thereof, at the instant of transfer. This, however, is associated with a loss of quality of a printed image transferred to the sheet, the loss of quality being expressed in the printed image in the form of a stripe transverse to the transport direction of the sheet through the printing unit. Furthermore, each of the aforementioned changes in the position of the chain rollers causes a vibration in the chain drive of the aforementioned type, such vibration being associated not only with a considerable generation of noise, particularly at high rotational speeds of the roller chain, but also with major problems with regard to wear and tear.

In the case of the aforementioned known chain drive, the above-indicated special measures in order to achieve a defined contact of the chain rollers with respect to guideways associated therewith are directed towards guideway sections of the roller chain which have end locations thereof in respective transfer locations at which the roller chain leaves a sprocket wheel or runs on to it, respectively. In such guideway sections, an upper and a lower of two mutually opposing guideways facing the chain rollers, respectively describe curves which, in the course thereof, have constant directions of curvature. Moreover, a tensioning device is provided, by means of which the chain rollers are supposed to be pressed onto one and the same guideway of a respective guideway pair.

SUMMARY OF THE INVENTION

It is accordingly an object of the invention to provide a chain drive of the type mentioned in the introduction hereto, with which, without special requirements as to the course or layout of the guideways, a defined guidance of the second chain link is always realized. With the foregoing and other objects in view, there is provided, in accordance with the invention, a chain drive with an endless chain formed by sideplate pairs and by articulated joints having mutually parallel joint axes and connecting the sideplate pairs, each of the joints having a chain roller concentric with the respective joint axis and having a cylindrical chain-roller contact surface, at least one section of the chain being formed by first chain links of equal pitch and a second chain link inserted between two of the first chain links which are disposed mutually adjacent to one another, the second chain link replacing two of the first chain links and being connected, respectively, by a first and a second joint to mutually adjacent first chain links, and sprocket wheels rotating during operation and being in engagement with the chain and with chain guides formed as mutually facing and mutually spaced apart guideways, comprising a supporting roller disposed at a longitudinal center of the second chain link and having a rotational axis parallel to the joint axes, and a cylindrical supporting-roller contact surface tangential to a first tangential plane extending parallel to the joint axes of the first and second joints, the first tangential plane being disposed opposite to and spaced from a second tangential plane likewise tangential to the supporting-roller contact surface, the first and the second tangential planes being disposed on one and the same side of a reference plane at respective first and second distances therefrom; the reference plane extending parallel to the joint axes of the first and second joints and being tangential to the chain-roller contact surfaces of chain rollers with which the first and second joints are furnished, at least one of the first and the second distances being greater than the diameter of the chain-roller contact surface.

In accordance with another feature of the invention, the supporting roller is disposed within the sideplate pair forming the second chain link.

In accordance with a further feature of the invention, the supporting roller is disposed on the outside of a sideplate of the sideplate pair forming the second chain link; and including two additional supporting rollers, respectively, having a cylindrical contact surface, and disposed on the outside of the sideplate with the first-mentioned supporting roller; the respective contact surfaces of the two additional supporting rollers being concentric with the respective joint axes of the first and second joints.

In accordance with an added feature of the invention, a first one of the two guideways is formed on a rigid first guidance, and the second one of the two guideways is formed on a second guidance provided with a resilient support formed for directing spring forces so as to counteract normal forces exerted on the second one of the two guideways.

In accordance with a concomitant feature of the invention, the supporting roller is movable between a starting position and a position located at a spaced distance therefrom, the rotational axis of the supporting roller being displaced within a displacement plane perpendicular to the reference plane, the distances of the first and second tangential planes from the reference plane being greater in the starting position than in the position located at the spaced distance therefrom; and a spring arrangement is provided for the second chain link, the spring arrangement engaging with and holding the supporting roller resiliently in the starting position thereof.

Such a construction simultaneously permits contact of the chain rollers of the second chain link with a first guideway and contact of the supporting roller with a second guideway of a guideway pair formed of two guideways disposed at a mutual distance apart from and facing one another. If an aforementioned chain delivery is furnished with a chain drive according to the invention, it is possible for the second chain link to be positively guided by means of such a guideway pair in a manner in which the chain rollers of the second chain link constantly roll on one, and the supporting roller constantly on the other of the two guideways. Consequently, operation-related forces exerted by the gripper bars on a second chain link, such as, in particular, centrifugal forces in curved lengths or sections of the guideways, have no influence on the position of the second chain link between the guideways with the result that abrupt movements of the gripper bars and the associated disadvantages, particularly the generation of noise and wear and tear, can be prevented.

As aforementioned, in a first different embodiment of the chain drive according to the invention, it is preferably provided that the supporting roller be disposed inside the sideplate pair forming the second chain link. This permits the particularly space-saving accommodation of the supporting roller, an essential advantage of this embodiment also being that, without any major measures, it permits the replacement of a previously installed conventional roller chain in a chain drive of the type mentioned at the introduction hereto.

Conversely, a second different embodiment calls for the supporting roller to be disposed on the outside of a sideplate of the sideplate pair forming the second chain link, two further supporting rollers, each with a cylindrical contact surface, being provided on the outside of the sideplate with the first-mentioned supporting roller, each of the contact surfaces of the two further supporting rollers being concentric with the respective joint axis of the first and second joints.

A particular advantage of the second different embodiment is that it is also possible for the further supporting rollers to be of a diameter greater than that of the chain rollers, with the result that, overall, lower values can be obtained for the compressive load per unit area between the supporting rollers and the guideways than in the hereinaforedescribed different embodiment.

Moreover, an advantageous further development of the invention permits a construction of the second chain link making full use of the customary tolerances for roller chains. In the further development, a first one of the two mutually spaced-apart guideways is formed on rigid first guiding means and the second one of the two guideways is formed on second guiding means provided with resilient or spring-loaded supporting means, the spring-loaded supporting means being constructed so as to produce spring forces directed in a manner that the spring forces counteract normal forces exerted on the second guideway.

Likewise, another advantageous further development of the invention permits a construction of the second chain link making full use of the customary tolerances for roller chains, without, however, special measures being required with regard to the guideways. In this further development, the support roller is movable between a starting position and a position at a distance therefrom, the rotation axis of the support roller being displaced within a displacement plane perpendicular to the reference plane, the distances of the tangential planes from the reference plane being greater in the starting position than in the position at a distance therefrom, the second chain link being furnished with a spring arrangement engaging with the supporting roller and holding the supporting roller in a resilient or spring-loaded manner in the starting position thereof.

Other features which are considered as characteristic for the invention are set forth in the appended claims.

Although the invention is illustrated and described herein as embodied in a chain drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Hereinbelow, the invention is described in greater detail with reference to specimen embodiments presented in the drawings, in which:

DESCRIPTION OF THE PREFERRED EMBODIMENTS

Figure 1:
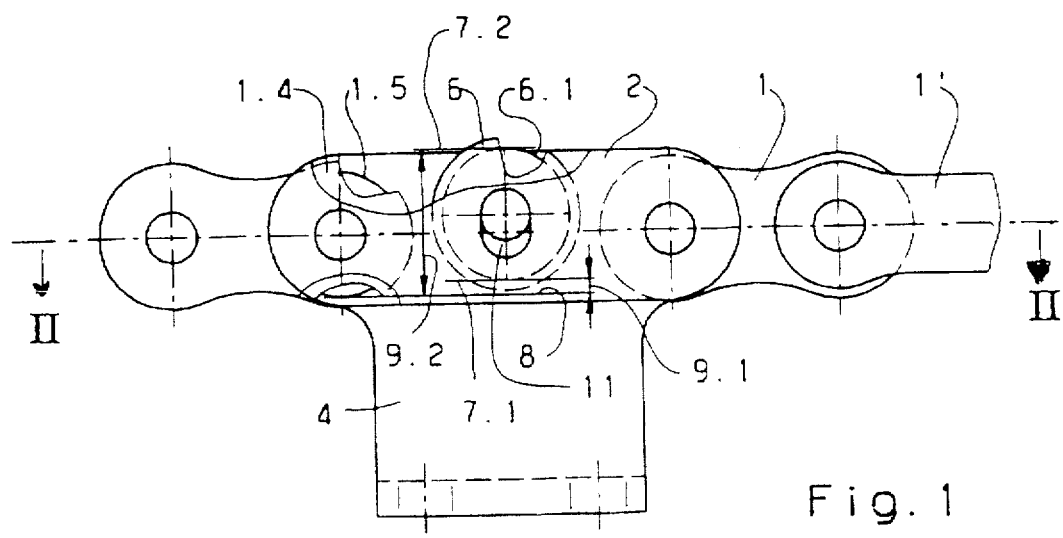
FIG. 1 is a diagrammatic side elevational view of part of a roller chain formed of first chain links and of a second chain link inserted between and replacing two of the first chain links, the second chain link having a supporting roller rotatable with respect to a rotational axis extending parallel to articulated joint axes of the roller chain and being disposed within a sideplate pair forming the second chain link.
Figure 2:
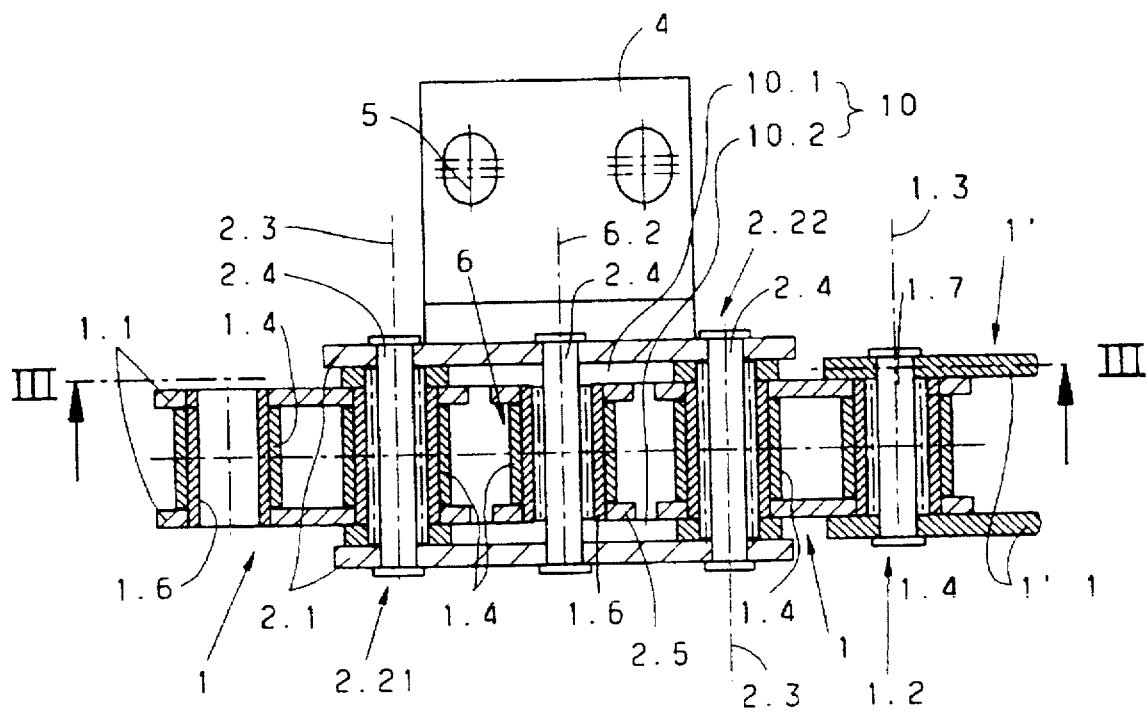
FIG. 2 is a longitudinal sectional view of FIG. 1 taken along the line II—II in the direction of the arrows, namely along an area spanned by the rotational axis of the supporting roller and the joint axes of the section of the roller chain shown in FIG. 1.
Figure 8:
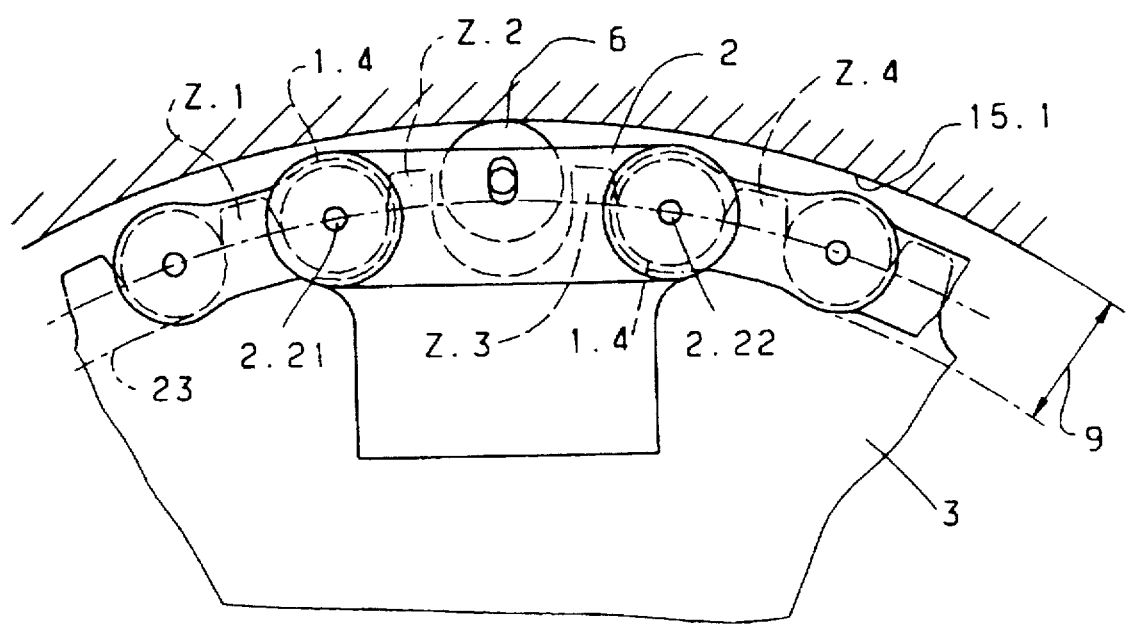
FIG. 8 is a view like that of FIG. 1 of the part of the roller chain shown looped around a sprocket wheel.

Referring now to the drawings and, first, particularly to FIGS. 1 and 2 thereof, there are shown therein first chain links 1 and 1' of equal pitch of a length or section of a roller chain enclosing a second chain link 2 which replaces two of the first chain links 1, 1'. According to the characteristics of a simple roller chain, the roller chain is formed of sideplate pairs 1.1, 1'.1, 2.1 and of articulated joints 1.2, 2.21, 2.22, which connect the sideplate pairs 1.1, 1'.1, 2.1 and have mutually parallel joint axes 1.3, 2.3, each joint 1.2, 2.21, 2.22 being furnished with a chain roller 1.4 concentric with the joint axis 1.3, 2.3 thereof and having a cylindrical chain-roller contact surface 1.5. The second chain link 2 is connected by means of a first and a second joint 2.21 and 2.22 to respective first chain links 1 and 1' adjacent to the second chain link 2. The section of a roller chain shown in FIG. 1 and 2 is part of an endless chain which is in engagement with sprocket wheels which rotate during operation. A corresponding sprocket wheel 3 is shown in FIG. 8 in an operating phase wherein the second chain link 2 is in engagement with the sprocket wheel 3.

If the chain having a length or section of such construction is used in a hereinbefore indicated transport system furnished with gripper bars, a chain link corresponding to the second chain link is inserted into the chain at uniform intervals along the chain, the chain link being, in particular, of such construction for the aforementioned application that an end of the aforementioned gripper bar is able to be attached thereto. For this purpose, in the example at hand, the second chain link 2 carries an angle or bracket 4 with fixing or mounting holes 5 formed therein.

Moreover, the second chain link 2 is provided with a supporting roller 6 disposed at the longitudinal center of the second chain link 2. The supporting roller 6 has a cylindrical supporting-roller contact surface 6.1 and is rotatable with respect to a rotational axis 6.2 extending parallel to the joint axes 1.3 and 2.3. Furthermore, the position of the supporting roller 6 becomes apparent from auxiliary lines introduced into FIG. 1, each of the auxiliary lines representing a part or section of a track of a plane and being identified by reference characters associated with the planes. More specifically, the planes are a first tangential plane 7.1 extending parallel to the joint axes 2.3 of the first and second joints 2.21 and 2.22 and touching or tangent to the supporting roller contact surface 6.1, a second tangential plane 7.2 disposed at a spaced distance from and parallel to the first tangential plane 7.1, the second tangential plane 7.2 likewise touching the supporting-roller contact surface 6.1, as well as a reference plane 8 extending parallel to the joint axes 2.3 of the first and second joints 2.21 and 2.22 and touching or tangent to the chain-roller contact faces 1.5 of those chain rollers 1.4 with which the first and second joints 2.21 and 2.22 are furnished. The two tangential planes 7.1 and 7.2 extend on one and the same side of the reference plane 8 and at first and second distances 9.1 and 9.2 therefrom. Of the distances 9.1 and 9.2, at least one, namely the distance 9.2 in the example at hand, is greater than the diameter of the chain-roller contact surface 1.5. As will become apparent from explanatory remarks hereinbelow, it is also basically within the scope of the invention for both distances 9.1 and 9.2 to be greater than the diameter of the chain-roller contact surface 1.5.

Furthermore, the supporting roller 6 is disposed within the sideplate pair 2.1 in the embodiment shown in FIGS. 1 and 2. The rotational axis 6.2 of the supporting roller 6, in a manner similar to the joint axes 2.3 of the first and second joints 2.21 and 2.22, extends longitudinally through a chain pin 2.4 bridging the sideplate pair 2.1. In the embodiment of FIGS. 1 and 2, the chain pin 2.4, in a manner identical to the chain pins 2.4 of the first and second joints 2.21 and 2.22, carries a chain sleeve 1.6 rotatably mounted by means of a needle bearing, one of the chain rollers 1.4 being slipped onto the chain sleeve 1.6. Deviating from the facts regarding the first and second joints 2.21 and 2.22, in the case of the supporting roller 6, each end face of the chain roller 1.4 has a respective flange 2.5 secured thereto which is flush with the respective end face of the chain sleeve 1.5.

Figure 3:
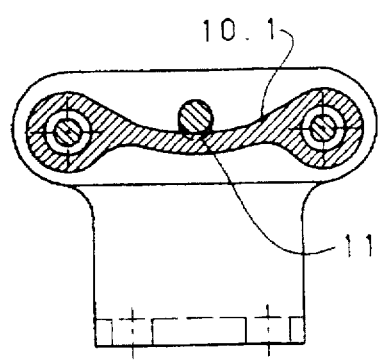
FIG. 3 is a sectional view of FIG. 2 taken along the line III—III in the direction of the arrows.

In the illustrated embodiment, the sideplate pair 2.1 forming the second chain link are outer sideplates. Whereas respective outer sideplates of the first chain links 1' directly adjoin the respective end faces of a chain sleeve 1.6, however, in the case of the second chain link 2, a space is provided between a respective end face of the associated chain sleeve 1.6 and a respective sideplate of the sideplate pair 2.1, a spring element 10.1, 10.2 being inserted in the space. Consequently, the chain pins 2.4 associated with the first and second joints 2.21 and 2.22, as well as the chain pin 2.4 carrying the supporting roller 6, are longer than chain pins 1.7 associated with a respective joint 1.2 between the first chain links 1, 1'. Moreover, according to the spring element 10.1 shown in section in FIG. 3, each of the spring elements 10.1, 10.2, with the interposition of a needle bearing in the embodiment at hand, is slipped onto the respectively like-directed ends of the chain pins 2.4 associated with the first and second joints 2.21 and 2.22 and underpins one of the like-directed ends of the chain pin 2.4 carrying the supporting roller 6, the latter chain pin 2.4 extending through a slot or oblong hole 11 formed in a respective sideplate of the sideplate pair 2.1 and extending perpendicularly to the reference plane 8. The spring arrangement 10 formed by the spring elements 10.1 and 10.2 holds the chain pin 2.4 carrying the supporting roller 6, and therefore the supporting roller 6 itself, resiliently or in a spring-loaded manner in a starting position defined by the fact that the chain pin 2.4 carrying the supporting roller 6 is in contact with the end of the respective slot 11 facing away from the reference plane 8. Thus, the supporting roller 6 is movable between the aforementioned starting position and a position at a spaced distance therefrom, opposite to the action of the spring arrangement and with the rotational axis 6.2 being displaced within a displacement plane perpendicular to the reference plane 8, the slots 11 serving as guides for the displacement. In this regard, each of the distances 9.1 and 9.2, respectively, between the tangential planes 7.1 and 7.2, on the one hand, and the reference plane 8, on the other hand, is greater with the supporting roller 6 in the starting position than when in the position at a distance from the starting position.

Figure 5:
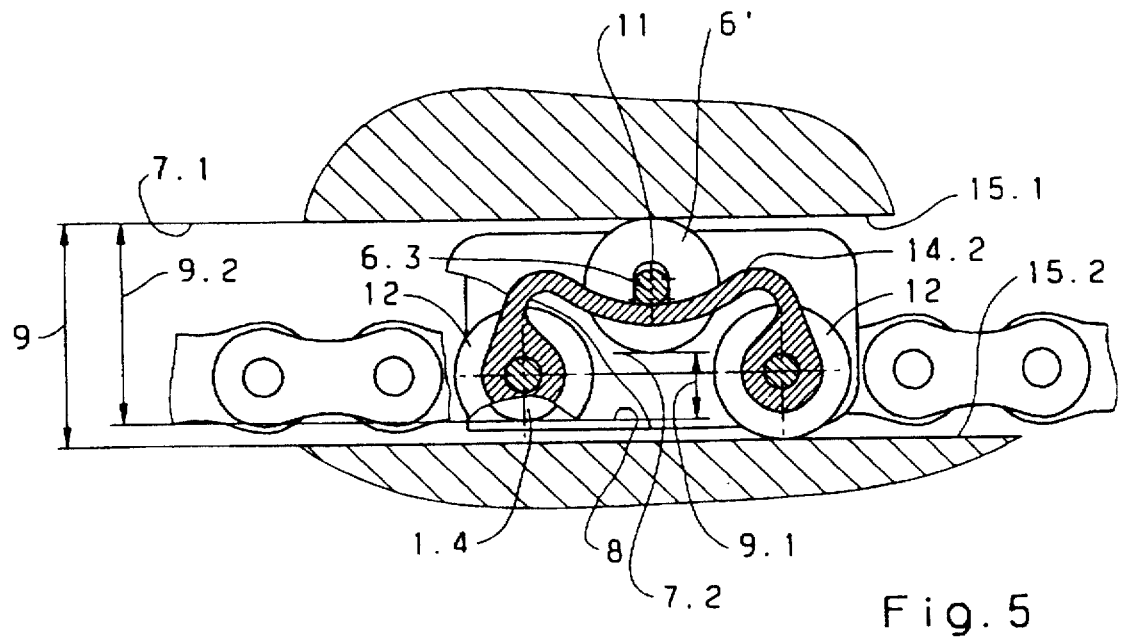
FIG. 5 is a sectional view of FIG. 4 taken along the line V—V in the direction of the arrows, and showing a first guideway guiding the supporting roller as well as a second guideway guiding the chain rollers.
Figure 4:
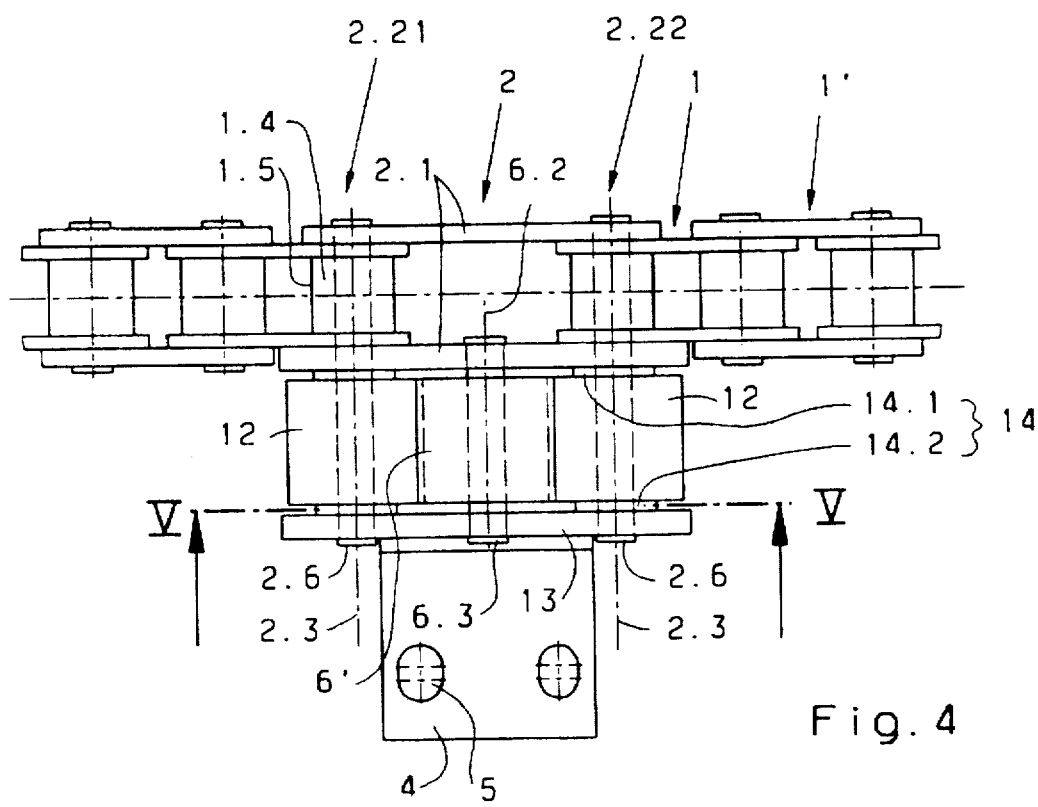
FIG. 4 is a diagrammatic top plan view of FIG. 1 showing the part of the roller chain wherein the supporting roller and two further supporting rollers are disposed on the outside of a sideplate of the second chain link.

In the embodiment shown in FIGS. 4 and 5, the herein diagrammatically illustrated supporting roller 6' is disposed on the outside of a sideplate of the sideplate pair 2.1 forming the second chain link 2, and two further supporting rollers 12, each with a cylindrical contact surface, are provided on the outside of the sideplate with the supporting roller 6' and are aligned in a manner that the contact surfaces thereof are concentric with the respective joint axes 2.3 of the first and second joints 2.21 and 2.22. For this purpose, the first and second joints 2.21 and 2.22 are each furnished with a chain pin 2.6 projecting beyond the aforementioned outside of the sideplate, the respective supporting rollers 12 being then rotatably mounted or journalled on the chain pins 2.6.

In the embodiment at hand, the outside of the sideplate is adjoined first of all by a spring element 14.1 followed by the further supporting roller 12 mounted on the respective chain pin 2.6, an adjoining further spring element 14.2 and an adjoining supporting plate 13 carried by the chain pins 2.6. The bracket 4 formed with the fixing or mounting holes 5 serves, in turn, for fixing an end of a gripper bar, said bracket 4 being carried by the supporting plate 13, in this embodiment. The spring elements 14.1 and 14.2, otherwise, in a manner analogous to the embodiment shown in FIG. 2, are slipped onto the chain pins 2.6 and underpin a respective end of a supporting-roller shaft 6.3, by means of which the supporting roller 6' is rotatably mounted with respect to the rotational axis 6.2 thereof. The supporting-roller shaft 6.3 extends through respective slots or oblong holes 11 formed in the supporting plate 13 and in a closest sideplate thereto of the sideplate pair 2.1. As in the exemplary embodiment shown in FIGS. 1 to 3, the slots 11 extend perpendicularly to the reference plane 8 and thus, in turn, form guides having the function explained hereinbefore in conjunction with FIGS. 1 to 3. The spring arrangement 14 formed by the spring elements 14.1 and 14.2, in turn, holds the supporting roller 6' resiliently or in a spring-loaded manner in a starting position wherein the supporting-roller shaft 6.3 is in contact with the end of the respective slot 11 facing away from the reference plane 8.

With each of the hereinaforedescribed different embodiments of the invention, it is possible to realize the constantly defined guidance of the second chain link 2 by means of conventional chain guides having mutually facing guideways disposed at a mutually spaced-apart distance, as shown by way of example in FIG. 5. In this example, the supporting roller 6' is associated with a first guideway 15.1, and the further supporting rollers 12 are associated with a second guideway 15.2. In addition, both guideways 15.1 and 15.2 are formed in a conventional manner on rigid guides.

The exemplary embodiment shown in FIGS. 4 and 5 makes use of the hereinbefore indicated possibility of additionally providing the further supporting rollers 12 with a diameter greater than that of the chain rollers 1.4. The mutual spaced distance 9 between the two guideways 15.1 and 15.2 is adjusted or matched to this fact or condition and, moreover, is such that the supporting roller 6' rolls on the guideway 15.1, the further supporting rollers 12 roll on the guideway 15.2, and the supporting-roller shaft 6.3 is moved, in opposition to a resetting force of the spring arrangement 14, from the hereinaforedescribed starting position of the supporting roller 6' towards the reference plane 8, with the result that the supporting roller 6' and the further supporting rollers 12 exert on the guideway 15.1 and the guideway 15.2, respectively, a normal force by means of which all play from the roller arrangement formed by means of the supporting roller 6' and the further supporting rollers 12 is forced out. It is consequently impossible for the aforementioned roller arrangement to be moved from being in contact with one of the two guideways 15.1 and 15.2, respectively, into contact with the other guideway 15.1 or 15.2 as a result of external forces, such as, in particular, centrifugal forces in curved lengths or sections of a transport path determined by the guideways 15.1 and 15.2.

This can also be achieved, in fact, if the supporting roller 6 or 6', in the aforedescribed different embodiments, is supported rigidly rather than by means of corresponding spring arrangements 10 and 14, respectively; however, this entails great demands on production accuracy with regard to the manufacture both of a corresponding roller arrangement and also of the guideways 15.1 and 15.2, insofar as they are formed exclusively on rigid guides.

A rigid support of the supporting roller 6 and 6', respectively, is preferably provided, however, for the use of a corresponding roller arrangement in conjunction with chain guides provided with resilient or spring-loaded supports.

Figure 6:
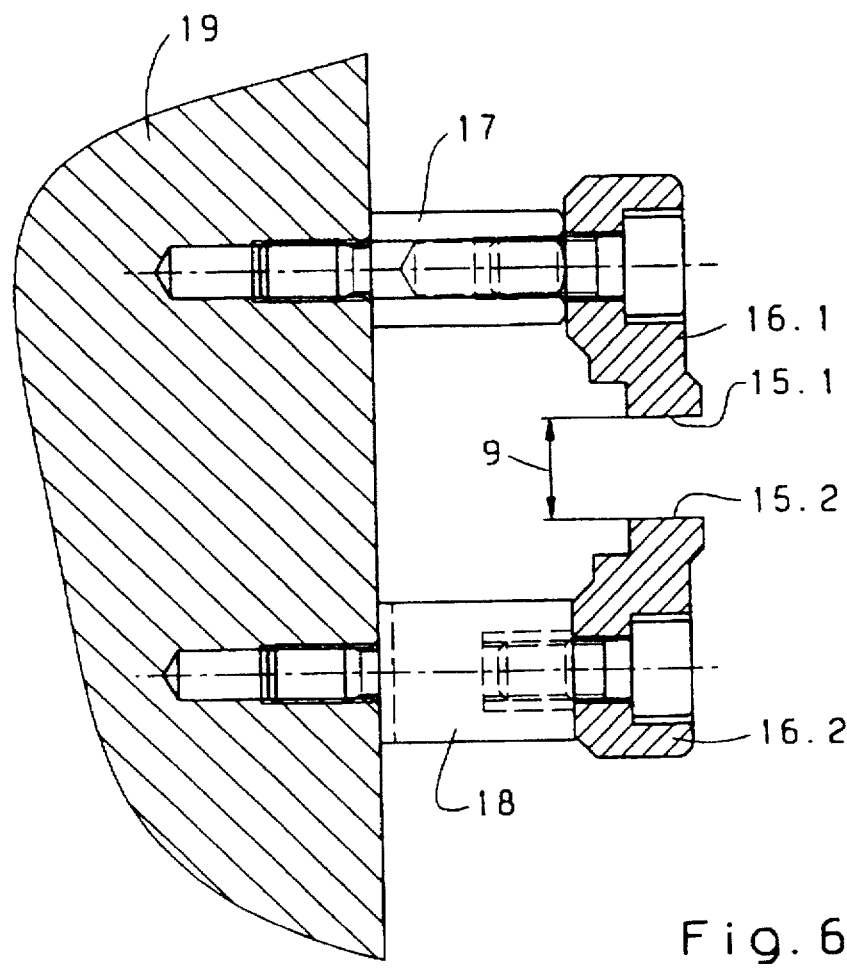
FIG. 6 is a cross-sectional view of a guide whereon the guideways are formed, a first one of the guideways being formed on a rigid guiding member, and a second one of the guideways being formed on guiding member provided with spring-loaded supports.

FIG. 6 shows such chain guides, which include guide rails 16.1 and 16.2, in a cross-sectional view. In this example, the guide rail 16.1 and the guide rail 16.2 are supported on a fixed wall 19, respectively, by means of studs 17 and by means of resilient or spring-loaded supports in the form of elastic damping elements 18.

If chain guides of such construction are used in conjunction with a roller arrangement according to the exemplary embodiment shown in FIGS. 1 and 2, but without the therein provided resilient or spring-loaded support of the supporting roller 6, i.e., in the form of a rigid roller arrangement, the mutual distance 9 between the two guideways 15.1 and 15.2 is then undersized when compared with a height of the rigid roller arrangement corresponding to the distance 9.2 according to FIG. 1. A rigid roller arrangement inserted as prescribed between the guideways 15.1 and 15.2 will locally expand the undersized distance 9, with a normal force being exerted on the two guideways 15.1 and 15.2, to a dimension corresponding to the distance 9.2, and will deflect the guideway 15.2 in opposition to the action of a thus caused resetting force on the part of the elastic damping elements 18. Consequently, the rigid roller arrangement is under a tensioning force from the guideways 15.1 and 15.2, the tensioning force, in turn, ensuring the always simultaneous contact of the roller arrangement with the guideways 15.1 and 15.2 and thus ensuring the continuously defined guidance of the second chain link 2.

Figure 7:
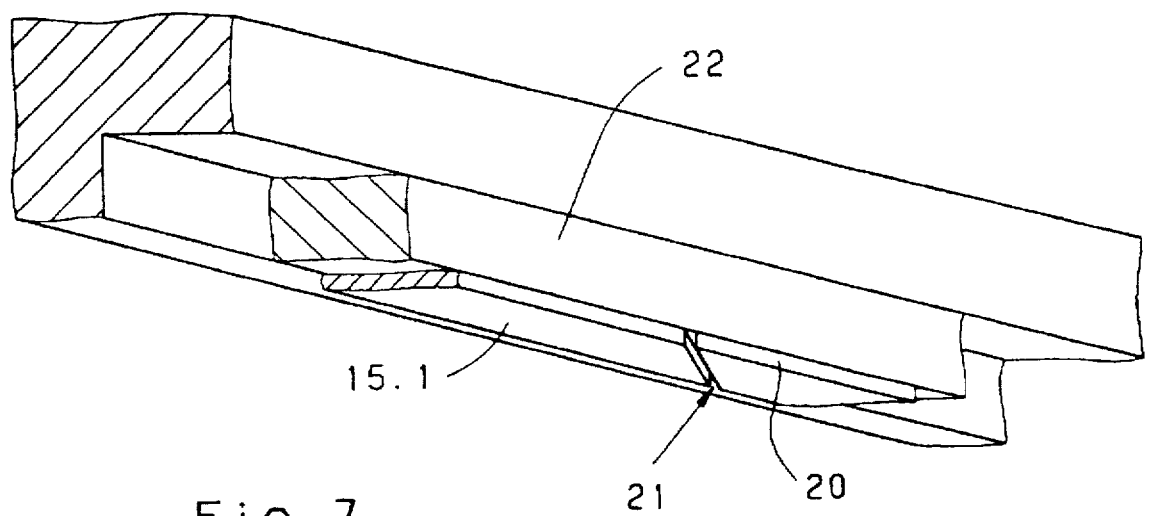
FIG. 7 is a perspective view of a part of a different embodiment of the guiding member provided with the spring-loaded supports, one of the two guideways being formed on that guiding member.

The different embodiment of guides provided with resilient or spring-loaded supports, which is shown in simplified form in FIG.7, is particularly suitable for the implementation of a closed guideway 15.1 enclosing the endless roller chain. The guideway 15.1, in this case, is formed on a spring-steel band 20, the ends of which are located opposite one another, forming a tolerance-compensation gap 21 extending diagonally to the transport direction of the roller chain. The spring-steel band 20 is underlaid by a spring-loaded shaped part 22, for example, formed of an elastomer having a hardness sufficient for the particular application. A connection between the spring-steel band 20 and the shaped part 22 may be effected by bonding with adhesive, if necessary or desirable. In practical use, the spring-steel band 20 encloses the roller chain along the entire length thereof and, in regions wherein the roller chain is not in engagement with a sprocket wheel, the guideway 15.1, formed on the spring-steel band 20, is opposite a guideway formed on rigid guides, there being the aforementioned, undersized distance 9 between the two guideways, with the result that, with respect to the aforementioned normal forces and spring forces, the same conditions apply as those explained with reference to the exemplary embodiment shown in FIG.6.

In FIG.8, there is shown an operating phase of the chain drive wherein a length or section of the roller chain illustrated in FIG. 1 is in a region wherein it is in looping engagement with a sprocket wheel 3. In this region, the chain guides are formed of one of the two aforementioned guideways, according to the overall mode of presentation in this case, thus the guideway 15.1, as well as the sprocket wheel 3, the root circle 23 of which represents, to a certain extent, a guideway opposite the guideway 15.1. In the aforementioned region in which the length or section of the roller chain is in looping engagement with the sprocket wheel 3, the guideway 15.1 extends outside and is concentric with the root circle 23 of the sprocket wheel 3, being separated therefrom by the same distance 9 that otherwise separates the mutually facing guideways 15.1 and 15.2 outside of the sprocket-wheel region. Otherwise, in the exemplary embodiment shown in FIG.8, the guideway 15.1 is formed on rigid guides. In this case, the defined guidance of the second chain link 2 is implemented by the resilient or spring-loaded support of the supporting roller 6 in the hereinaforedescribed manner.

As is apparent from FIG.8, a chain drive of the aforedescribed type provides an additional advantage in the aforementioned sprocket-wheel region particularly in the case of a guideway 15.1 formed on rigid guides and a resilient or spring-loaded supporting roller 6, on the one hand, and in the case of a rigidly supported supporting roller 6 and a guideway 15.1 formed on resilient or spring-loaded supports, on the other hand, respectively. The additional advantage is that the chain rollers 1.4 provided on the first and second joints 2.21 and 2.22 are pressed against mutually facing tooth flanks or sides of a first tooth Z.1 and of a thereafter following fourth tooth Z.4 of the sprocket wheel 3, with the result that the second chain link 2 is fixed with respect to the sprocket wheel 3 in the circumferential direction thereof. The aforementioned advantage is of particular effect if the sprocket wheel 3 is one that is associated with the delivery drum mentioned in the introduction hereto and if the transfer of a printed sheet to the delivery drum takes place before the entire length of the sheet has been printed.

In order to ensure in all cases that the chain rollers 1.4 provided on the first and second joints 2.21 and 2.22 are pressed in the aforedescribed manner against the aforementioned tooth flanks, material has been removed from the mutually facing flanks of the second tooth Z.2 following the first tooth Z.1, and of the third tooth Z.3 following the second tooth Z.2, so that there is no possibility of contact between the supporting roller 6 and the sprocket wheel 3.

As is apparent from the foregoing explanatory remarks, the second distance 9.2 indicated in FIG. 1 between the tangential plane 7.2 and the reference plane 8 is decisive with regard to the spaced distance 9 between the guideways 15.1 and 15.2, on the one hand, and between the guideway 15.1 and the root circle 23, on the other hand, respectively; that is, a great height of the aforementioned roller arrangement necessitates a correspondingly large respective distance 9 at the chain guides. Consequently, it is also basically possible for both of the distances 9.1 and 9.2 indicated in FIG. 1 to be greater than the diameter of the chain-roller contact surface 1.5. In any case, it is necessary only to adjust or match the aforementioned spaced distance 9 at the chain guidance to the distance 9.2, which may be increased, if necessary or desirable.

I claim:

1. Chain drive with an endless chain formed by sideplate pairs and by articulated joints having mutually parallel joint axes and connecting the sideplate pairs, each of the joints having a chain roller concentric with the respective joint axis and having a cylindrical chain-roller contact surface, at least one section of the chain being formed by first chain links of equal pitch and a second chain link inserted between two of the first chain links which are disposed mutually adjacent to one another, the second chain link replacing two of the first chain links and being connected, respectively, by a first and a second joint to mutually adjacent first chain links, and sprocket wheels rotating during operation and being in engagement with the chain and with chain guides formed as mutually facing and mutually spaced apart guideways, comprising a supporting roller disposed at a longitudinal center of the second chain link and having a rotational axis parallel to the joint axes, and a cylindrical supporting-roller contact surface tangential to a first tangential plane extending parallel to the joint axes of the first and second joints, said first tangential plane being disposed opposite to and spaced from a second tangential plane likewise tangential to said supporting-roller contact surface, said first and said second tangential planes being disposed on one and the same side of a reference plane at respective first and second distances therefrom; said reference plane extending parallel to the joint axes of the first and second joints and being tangential to the chain-roller contact surfaces of chain rollers with which the first and second joints are furnished, at least one of said first and said second distances being greater than the diameter of the chain-roller contact surface.

2. Chain drive according to claim 1, wherein said supporting roller is disposed within the sideplate pair forming the second chain link.

3. Chain drive according to claim 1, wherein said supporting roller is disposed on the outside of a sideplate of the sideplate pair forming the second chain link; and including two additional supporting rollers, respectively, having a cylindrical contact surface, and disposed on the outside of the sideplate with the first-mentioned supporting roller; the respective contact surfaces of the two additional supporting rollers being concentric with the respective joint axes of the first and second joints.

4. Chain drive according to claim 1, wherein a first one of the two guideways is formed on a rigid first guidance, and the second one of the two guideways is formed on a second guidance provided with a resilient support formed for directing spring forces so as to counteract normal forces exerted on the second one of the two guideways.

5. Chain drive according to claim 1, wherein said supporting roller is movable between a starting position and a position located at a spaced distance therefrom, said rotational axis of said supporting roller being displaced within a displacement plane perpendicular to said reference plane, said distances of said first and second tangential planes from said reference plane being greater in said starting position than in said position located at said spaced distance therefrom; and including a spring arrangement for the second chain link, said spring arrangement engaging with and holding said supporting roller resiliently in said starting position thereof.

* * * * *